INVENTORS
ERNEST J. GREENWOOD
RICHARD I. SEARS
PHILIP S. THORJUSEN
BY
ATTORNEYS

Dec. 28, 1954   E. J. GREENWOOD ET AL   2,698,149
AIRCRAFT SPEED RETARDING DEVICE
Filed May 2, 1952                                           2 Sheets-Sheet 2
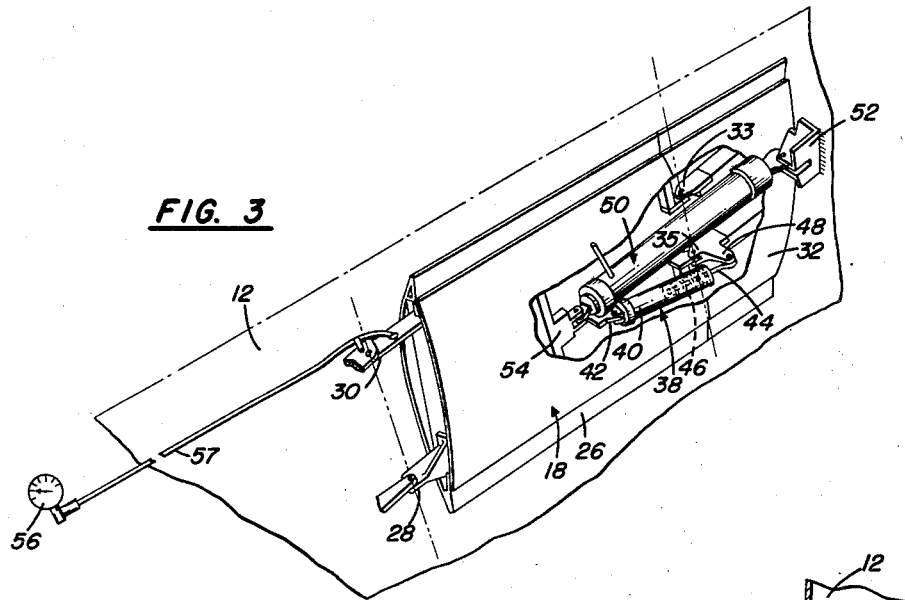
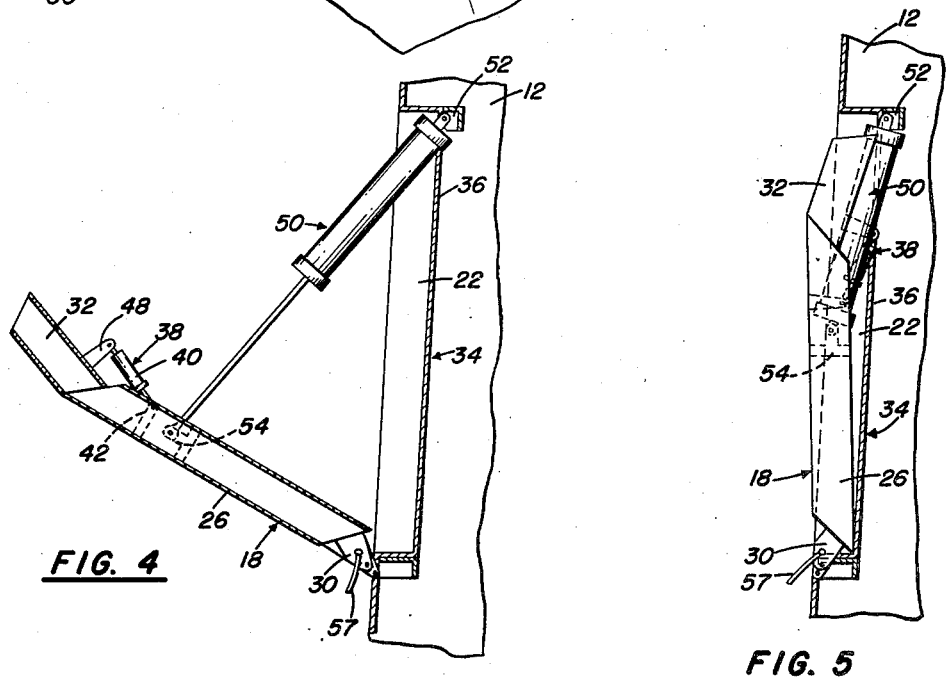
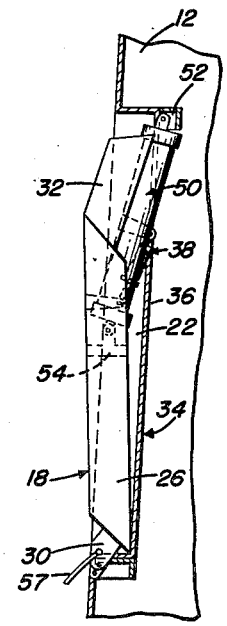
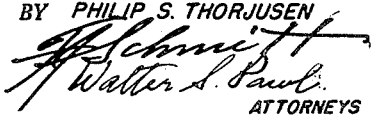
INVENTORS
ERNEST J. GREENWOOD
RICHARD I. SEARS
BY PHILIP S. THORJUSEN
ATTORNEYS

United States Patent Office 2,698,149
Patented Dec. 28, 1954

2,698,149

AIRCRAFT SPEED RETARDING DEVICE

Ernest J. Greenwood, Stratford, Conn., Richard I. Sears, Hampton, Va., and Philip S. Thorjusen, Dallas, Tex., assignors, by mesne assignments, to the United States of America as represented by the Secretary of the Navy Application May 2, 1952, Serial No. 285,658

13 Claims. (Cl. 244—113)

This invention relates to improvements in air brakes of the type used to decrease aircraft speed by projecting a panel into the airstream as the aircraft is in flight.

In military aircraft, particularly fighter and fighter bomber type aircraft, it is highly desirable to be able to dive from great altitudes to lower altitudes in a very short time. Heretofore, aircraft of the above-mentioned type could not attain either the speed or altitude that the present day aircraft attain, and consequently, several of the problems that are encountered today were non-existent several years ago. One of the present problems is to keep a diving aircraft from attaining air speeds at which the aircraft cannot be controlled. If an aircraft is not equipped with air brakes, a pilot must be very careful when diving his airplane or he will soon reach a speed at which his craft is uncontrollable. Before entering a dive, especially from great altitudes, the angle of the dive must be carefully considered with respect to air speed, attitude must be noted, length and angle of dive, and other factors have to be taken into consideration. These restrictions are, of course, undesirable for often a pilot wishes to enter a dive on very short notice and does not have time to calculate his dive angle and the various other factors that must be considered for an aircraft that is not equipped with a speed-retarding device. A pilot should be able to dive his aircraft at any controllable speed, from any sufficient height, and at any angle, and accordingly, it is an object of this invention to provide an air brake which will afford much better diving characteristics in the aircraft, and provide a light weight structure, the lightness of weight being made possible by arranging the device so that aerodynamic forces are applied in such a way as to supplant structures which would ordinarily be necessary in a conventional air brake system.

Another object of the invention is to provide a flap on the trailing edge of the air brake panel, which is constantly biased by yielding means to an angularly deflected position with respect to the panel so that as soon as the panel is actuated a slight amount from the ineffectual, closed position, the yielding means slide the outer edge of the flap on a relatively stationary framing member causing the flap to apply a mechanical force on the panel which aids in actuating the panel, and at the same time producing an aerodynamic total force on the panel also aiding it to be actuated.

A further object of the invention is to arrange the hinge axis of the panel at an angle to the general longitudinal axis of the fuselage so that when the panel together with its flap are laterally displaced from the fuselage, the airstream air disturbed by the air brake is deflected to pass below the empennage.

Other objects and features will become apparent in following the description of the illustrated embodiment of the invention.

In the drawings:

Fig. 3 is a perspective view of one of the air brakes;

Fig. 4 is a longitudinal sectional view of one of the brakes showing it in the full open position and;

Fig. 5 is a sectional view similar to Fig. 4, but showing the brake in an almost closed position.

Figure 1:
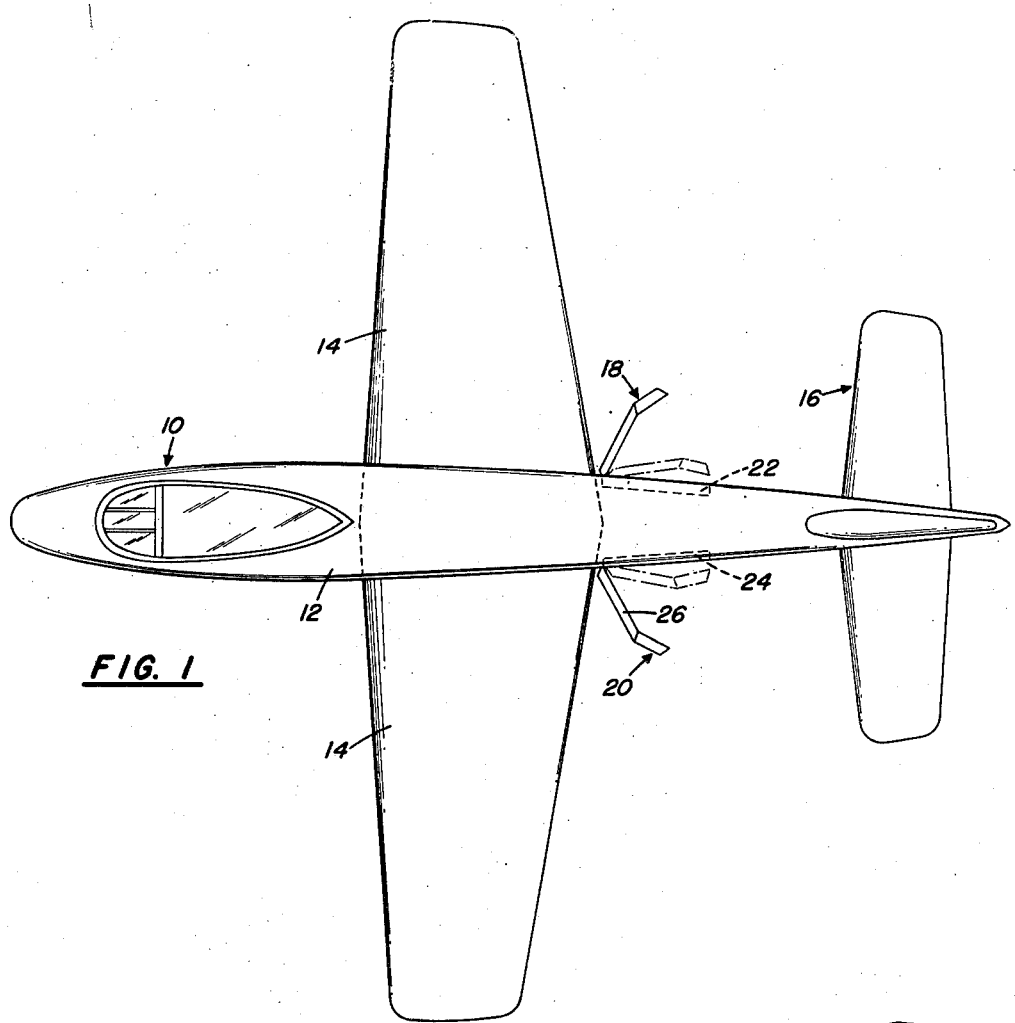
Fig. 1 is a plan view of a conventional aircraft fitted with the improved air brakes.
Figure 2:
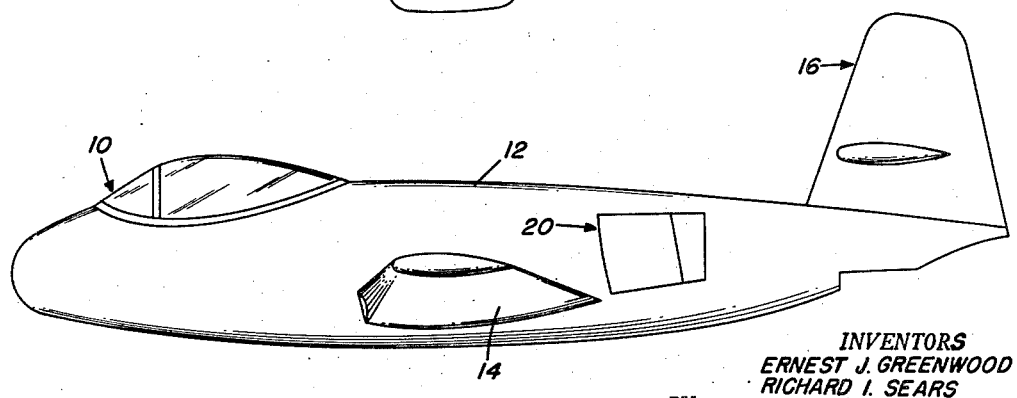
Fig. 2 is a side view of the aircraft of Fig. 1.

Referring to the drawings, there is an aircraft 10 of standard configuration and including a fuselage 12 provided with wings 14 and an aft supported empennage 16. Although only one type of aircraft is shown, it is illustrative of any airplane which would have use for an airbrake. The air brake assembly is made of two brakes 18 and 20, each of which is similar in construction, the brake 18 being mounted in a well 22 and the brake 20 being mounted in a well 24. As shown in Fig. 1, the well 22 is in one side of the fuselage 12 and the well 24 is in the opposite side of the fuselage, both wells being located in advance of the empennage 16 and downstream of the wings 14. This is the aerodynamically and structurally preferable location for the air brake, although other locations may be selected.

The brake 18 consists of a member providing an air braking surface, such as panel 26, which is hinged along its front edge by means of hinges 28 and 30 to the fuselage 12. The two hinges are so arranged that they have a common hinge axis which is at an angle to the general longitudinal axis of the fuselage so that when the panel 26 is hingedly actuated to an open position, the panel 26 droops. This drooping effect aids in directing the turbulent air produced by the panel, to pass below the empennage 16 and thereby reduce any buffet tendencies that might be incurred.

Means are mounted on the trailing edge of the panel 26 for applying an aerodynamic force on the panel to aid in moving the panel from a closed position within the well 24 to an opened, operative position. As shown in Figs. 3–5, the preferable means consist of a flap 32 which is connected to the panel 26 by means of hinges 33 and 35, and which is capable of limited pivotal movement with respect to the panel 26 about the common axis of the hinges 33 and 35. Not only does the flap 32 exert an aerodynamic force on the panel 26 but also, due to its structural arrangement in its well, it exerts a mechanical force on the panel 26 to aid in forcing the panel into the airstream. The panel 26 and flap 32 may be provided with back surface covers (Fig. 3) if desired.

The mechanical assistance provided by the flap 32 is accomplished in this way: A frame 34 is mounted in the well 22 and includes among other structures, side framing members 36 which serve as rails upon which the trailing edge of the flap 32 slides. A compression strut 38 including a cylinder 40 pivoted by means of a pin and bracket 42 on the panel 26, together with a piston 44 slidable in the cylinder, and spring 46 reacting on the cylinder and piston tending to withdraw the piston into the cylinder at all times, is operatively connected with the flap 32. The rod of the piston 44 is pivoted to an arm 48 that is carried by the flap hinge 35 whereby the compression strut 38 tends always to buckle the flap 32 with respect to the panel 26 as shown in Fig. 4. After the compression strut 38 has moved the flap 32 through a predetermined narrow range of angularity, about 20°, the arm 48 contacts the cylinder 40 thereby serving as a stop to prevent further pivotal movement of the flap 32 in one direction.

The panel 26 should be capable of swinging through an arc of about sixty degrees in the operation thereof and to accomplish this a fluid motor 50 of standard form is pivoted at one end to a fuselage mounted bracket 52, and at the other end to a panel supported bracket 54. To inform the pilot of the instant air brake position a suitable gage 56 is mounted accessibly to the pilot and a flexible cable 57 or the like is fastened to an appropriate part of the brake, such as the movable leaf of one of the hinges 28 or 30 and the gage 56 to operate the latter.

The specific structure of the brake 18 has been described, and this leads to an understanding of the specific structure of the brake 20 because the brake 18 is identical to it. The brakes 18 and 20 are synchronized in operation by conventional means, for example, by applying equal fluid pressures in the fluid motors 50 of each brake assembly. The conventional type of operating mechanism may be pilot controlled by means known in the art, or could be automatically controlled by a mechanism that functions from an air speed indicator. Moreover, an automatic actuator could be connected directly from a static tube in the airstream to a pressure sensitive device which would, in turn, control the motors 50.

In operation, when it is desired to move the air brakes 18 and 20 from their completely retracted positions in the fuselage wells, the fluid motor 50 of each brake is actuated and they begin to extend. On initial extension of each motor 50 the brakes 18 and 20 buckle inasmuch as the compression strut 38 functions as a motor (see Fig. 5). The spring 46 in the strut 38 is in a compressed condition when the brake 18 is fully closed, and when the panel 26 is displaced even the slightest amount from the well 22, the strut 38 becomes a motor, hingedly actuating the flap 32 with respect to the panel 26 and causing the trailing edge of the flap 32 to slide on the framing members 36. The buckling of the flap 32 relative to the panel 26 causes a reduced pressure on the outer surface of the brake 18 and the reduced pressure greatly aids in actuating the brake to its fully effective braking position. Also, this pressure reduction allows the brake 18 and motor 50 to be made of lighter construction.

As the motor 50 continues to extend, the panel 26 is forced further into the airstream and becomes more effective. As the panel 26 goes farther into the airstream the air loads are increased and the angular relation between the panel 26 and flap 32 is not changed from the maximum allowable by contact of the bracket 48 with the cylinder 40. However, during the range of operation of the panel 26 between the fully closed and that where the arm 48 and cylinder 40 contact, the trailing edge of the flap has been slid upon the framing members 36 by the action of the strut 38 while it is functioning as a motor. The reaction of this action is in the panel 26, applied at its trailing edge and in a direction which assists the motor 50 to move the panel 26 into the airstream.

When the air brakes are to be moved from an open to a closed position, the motor 50 of each brake is actuated by the previously mentioned conventional controls and in a reverse direction. As the brake swings toward the fuselage 12 the trailing edge of the flap 32 is the first portion of the brake to contact the fuselage 12 due to the angularity between flap 32 and the panel 26. As the motor 50 retracts further the compression strut 38 is extended, yieldingly opposing pivotal movement of the flap 32 while portions of its trailing edge slide along the framing members 36. When the brake is in the fully retracted position, it fits its well thereby leaving the fuselage aerodynamically clean.

It is apparent that modifications may be made without departing from the scope of the following claims.

What is claimed is:

1. In an aircraft having a fuselage, an air brake comprising a panel hinged to the fuselage at its front edge and having its rear edge arranged to swing into the airstream when the aircraft is in flight, means including a flap hinged to the rear edge of said panel to reduce the wind loads on said panel, means operatively connected with said panel for actuating said panel, and means connected to and reacting on said panel and said flap for moving said flap through a limited range of angles with respect to said panel.

2. In an aircraft, a fuselage, an air brake comprising a member having a brake surface, means hingedly connecting one edge of said member to the fuselage for swinging movement into the airstream while the aircraft is in flight, and means connected to said member for producing an aerodynamic force on said member to aid in swinging said member into the airstream.

3. In an aircraft which is provided with a fuselage having a frame carried thereby, an air brake comprising a member having a brake surface, means hingedly connecting one edge of said member to the side of the fuselage whereby said member is capable of swinging movement into the airstream while the aircraft is in flight, means connected to the opposite edge of said member and contacting said frame during the initial stages of the swinging movement for producing an aerodynamic force on said member to aid in swinging said member into the airstream, the last-mentioned means including a flap pivoted to the opposite edge of said member, and a motor connected with said flap to pivotally actuate said flap with respect to said member.

4. In an aircraft which is provided with a fuselage having a frame carried thereby, an air brake comprising a member having a brake surface, means hingedly connecting one edge of said member to the side of the fuselage whereby said member is capable of swinging movement into the airstream while the aircraft is in flight, means connected to the opposite edge of said member for producing an aerodynamic force on said member to aid in swinging said member into the airstream, the last-mentioned means including a flap pivoted at one of its edges to said member, the opposite edge of said flap slidably contacting said frame during the initial stages of the swinging movement, said flap and said member being smoothly faired in the fuselage when the air brake is in an inoperative position, and a motor connected to said flap to pivotally actuate said flap with respect to said member and slide on said frame the edge of the flap which contacts said frame thereby aiding in projecting said member into the airstream.

5. The combination of claim 4 and; means operatively connected with said flap and said member for limiting the extent of relative pivotal movement between said flap and said member.

6. In an aircraft having a fuselage with an empennage and a longitudinal axis, an air brake assembly on opposite sides of said fuselage, said assembly including a panel displaceable laterally of the fuselage and into the airstream when the aircraft is in flight, a hinge connecting said panel to the fuselage and having a hinge axis disposed with respect to said longitudinal axis so that said panel is also vertically displaced when the panel is laterally displaced with respect to said fuselage in order that the panel aids in directing the turbulent air produced by flow around said panel to pass beyond the empennage, means secured to said panel operatively connected with said panel for actuating said panel, and means connected with said panel for assisting the actuation of said panel.

7. In an aircraft having a fuselage with an empennage and a longitudinal axis, an air brake assembly on opposite sides of said fuselage, said assembly including a panel displaceable laterally of the fuselage and into the airstream when the aircraft is in flight, a hinge connecting said panel to the fuselage and having a hinge axis at an angle to said longitudinal axis so that said panel is also vertically displaced when the panel is laterally displaced with respect to said fuselage in order that the panel aids in directing the turbulent air produced by flow around said panel to pass beyond the empennage, means for actuating said panel, and means including a flap connected with said panel for producing an aerodynamic force on said panel when said panel is initially displaced into the airstream for aiding in the actuation of said panel.

8. The combination of claim 6 and the fuselage having a framing member behind said actuation assisting means on which said actuation assisting means is initially slidably disposed.

9. The combination of claim 8 and said actuation assisting means including a flap, a hinge connecting said flap to said panel, and yielding means connected with said flap to hingedly move said flap relative to said panel and initially slide a part of said flap on said framing member to thereby mechanically assist in the displacement of said panel into the airstream.

10. In combination with an aircraft fuselage having an empennage and wings, an air brake located in advance of the empennage and rearwardly of the wings, said brake including means providing an airstream brake surface hinged to the fuselage, actuation means connected with said surface providing means, and means operatively connected with said surface providing means for producing mechanical and aerodynamic forces to assist said actuation means.

11. In an aircraft fuselage having an empennage and wings, an air brake located in advance of the empennage and behind the wings, said brake comprising a panel, a hinge connecting one end of said panel to the fuselage and having a hinge axis arranged with respect to the general longitudinal axis of the fuselage so that when said panel is hinged outwardly of the fuselage the panel droops downwardly in order to divert the air of the airstream disturbed by the panel away from the empennage, means connected with said panel for hingedly actuating said panel, and means connected with the panel operable during the initial actuation of the panel from the closed toward the full open position for applying a force on the panel directed to assist in hingedly actuating said panel.

12. The air brake of claim 11 and; the last-mentioned means applying a mechanical force together with an aerodynamic force to assist in hingedly actuating said panel, and including a flap hinged to said panel and slidably contacting a part of the fuselage when the flap is initially actuated.

13. The air brake of claim 12 and; said force applying means comprising a flap hingedly connected with said panel, and yielding means secured to said flap for constantly biasing said flap to an angularly deflected position relative to said panel.

References Cited in the file of this patent

UNITED STATES PATENTS

| Number | Name | Date |
|---|---|---|
| 2,400,388 | Campbell | May 14, 1946 |
| 2,418,273 | Moore | Apr. 1, 1947 |
| 2,461,967 | Devlin | Feb. 15, 1949 |
| 2,553,642 | Eaton | May 22, 1951 |